United States Patent
Zipperer et al.

(10) Patent No.: US 8,234,430 B2
(45) Date of Patent: Jul. 31, 2012

(54) APPARATUS AND METHOD WITH CONTROLLED SWITCH METHOD

(75) Inventors: Johann Zipperer, Garching (DE); Horst Diewald, Freising (DE)

(73) Assignee: Texas Instruments Incorporated, Dallas, TX (US)

( * ) Notice: Subject to any disclaimer, the term of this patent is extended or adjusted under 35 U.S.C. 154(b) by 358 days.

(21) Appl. No.: 12/640,605

(22) Filed: Dec. 17, 2009

(65) Prior Publication Data

US 2010/0191979 A1 Jul. 29, 2010

(30) Foreign Application Priority Data

Dec. 17, 2008 (DE) .................. 10 2008 062 692

(51) Int. Cl.
*G06F 13/24* (2006.01)
(52) U.S. Cl. ......... 710/260; 710/262; 710/266; 710/269
(58) Field of Classification Search .................. 710/260, 710/262, 266, 269
See application file for complete search history.

(56) References Cited

U.S. PATENT DOCUMENTS

| | | | | |
|---|---|---|---|---|
| 4,982,404 A * | 1/1991 | Hartman | ........................ | 714/55 |
| 5,774,734 A | 6/1998 | Kikinis et al. | | |
| 6,378,065 B1 * | 4/2002 | Arnold et al. | ................. | 712/228 |
| 6,499,078 B1 * | 12/2002 | Beckert et al. | ................ | 710/260 |
| 6,665,802 B1 | 12/2003 | Ober | | |
| 6,820,155 B1 * | 11/2004 | Ito | ................................. | 710/262 |
| 6,968,411 B2 * | 11/2005 | Gaur et al. | ..................... | 710/260 |
| 7,076,802 B2 * | 7/2006 | Poisner | ............................ | 726/22 |
| 7,100,068 B2 * | 8/2006 | Shyu | .............................. | 713/600 |
| 7,269,678 B2 * | 9/2007 | Nishimura | .................... | 710/260 |
| 2007/0198759 A1 | 8/2007 | Agarwal | | |

OTHER PUBLICATIONS

TriCore 1 32-bit Unified Processor Core; vol. 1: v1.3 Core Architecture, Edition 2005-02, pp. 6-1 through 6-15.
German Office Action dated Jul. 27, 2009.

* cited by examiner

*Primary Examiner* — Brian Misiura
(74) *Attorney, Agent, or Firm* — Robert D. Marshall, Jr.; Wade James Brady, III; Frederick J. Telecky, Jr.

(57) ABSTRACT

An embedded microcontroller system comprises a central processing unit, a system controller for receiving and handling an interrupt, a register having storage locations containing sets of predefined system data for different operating conditions of the system assigned to the interrupts coupled to set a system configuration. The system data in the register is defined and stored before receipt of an interrupt. On receipt of an interrupt the system controller transmits a selection signal to the register. The register selects a predefined storage location assigned to the received interrupt. The corresponding system configuration data is used to control system configuration of the embedded microcontroller system, such as allocation of CPU time to virtual CPUs and selection of clock frequency or power voltage for modules.

14 Claims, 7 Drawing Sheets

| Agent0.Reg_0 | SUB-IDENTIFIER | IDENTIFIER/ENTITY |
|---|---|---|
| Agent0.Reg_1 | | STACK(POINTER) |
| Agent0.Reg_2 | | SUPPLY ON/OFF, e.g. FLASH0 |
| Agent0.Reg_3 | SUPPLY ON/OFF, e.g. FLASH1 DURING LPM3 | |
| Agent0.Reg_4 | LOCK | VCC, f(SYSTEM) |
| Agent0.Reg_n | | ... |

| Agentn.Reg_0 | SUB-IDENTIFIER | IDENTIFIER/ENTITY |
|---|---|---|
| Agentn.Reg_1 | | STACK(POINTER) |
| Agentn.Reg_2 | | SUPPLY ON/OFF, e.g. FLASH0 |
| Agentn.Reg_3 | SUPPLY ON/OFF, e.g. FLASH1 DURING LPM3 | |
| Agentn.Reg_4 | LOCK | VCC, f(SYSTEM) |
| Agentn.Reg_n | | ... |

APPARATUS AND METHOD WITH CONTROLLED SWITCH METHOD

CLAIM OF PRIORITY

This application claims priority under 35 U.S.C. 119(a) to German Patent Application No. 10 2008 062 692.9 filed Dec. 17, 2008.

TECHNICAL FIELD OF THE INVENTION

The technical field of this invention is an embedded microcontroller system with a central processing unit (CPU) and a system controller and circuitry and a method for configuring the embedded microcontroller system.

BACKGROUND OF THE INVENTION

Controllers and computer programs use operating systems (OS) or specific derivatives of operating systems in order to react to requests for system configurations relating to hardware and software resources. Many applications especially in embedded computing need to respond precisely, in a well predefined manner and deterministically to requests from hardware and software. These requests may be sent from a communication interface, analogue components or simple a timer which triggers the software to proceed. Operating systems that require such deterministic features are usually real-time operating systems (RTOS).

The OS or RTOS handles all received requests, controls memory allocation and de-allocation, initiates the software to start the handler for that request and organizes the return information etc. The OS or RTOS is flexible and can be adapted to various embedded controller or processing unit architectures. This flexibility through the software of an OS consumes a price in important system resources. The OS or RTOS takes time, clock cycles and memory and thus uses resources beyond the real task to be performed. Therefore, the typical OS consumes power and execution time in order to organize reliable software execution.

Generally a request is triggered by an interrupt and controlled by passing the request to the OS, which acts as a supervisor. The OS sets up the needed resources for the requested task, transfers the execution to the handler of the request, returns response data back to the OS, rewinds the resource allocation (if necessary) and returns to the previous task or other task when complete. The OS maintains a list of all pending and active tasks and their resource allocation.

SUMMARY OF THE INVENTION

This invention is an embedded microcontroller system that can be configured to handle task request from hardware of software with less overhead, less power and a shorter time, than conventional OS-based systems.

The embedded microcontroller system includes a central processing unit and a system controller for receiving and handling interrupts. The embedded microcontroller system also includes a register with storage locations containing sets of predefined system data for different operating conditions of the system assigned to the interrupts. The register sets system configurations using the register content. The system data in the register is defined and stored before receipt of an interrupt. A received interrupt is assigned corresponding system data in the register. The system controller transmits a selection signal to the register to select and activate a predefined storage location assigned to the received interrupt. The corresponding system configuration is set using the predefined system data in the register. Such system configurations are conventionally set through execution of software routines of the operating system after receipt of a respective interrupt. Using the predefined register contents of this invention avoids further interaction of the operating system of the embedded microcontroller system when setting the operating conditions.

The embedded microcontroller system of one embodiment of this invention includes at least one additional register which contains specific system data. This additional register may advantageously be a dedicated semiconductor hardware register. The system data in the additional register may be determined through early negotiations between the OS and an application or driver. The negotiation results enable the hardware, software or driver to handle requests directly without intervention of the OS. A request is usually triggered by a hardware or software interrupt or an exception. In this invention the interrupt not only triggers a microcontroller (MCU core system) which executes or handles the request, but once the interrupt is accepted, it also enables a register or more specifically a set of registers. In response to the interrupt, the system configuration data stored in the registers sets and controls the operating conditions and behavior of the system when partial or complete control has finally passed to the task handling software and hardware or hardware/software combination. This is after the system has assumed the new system conditions or the new system setup. The additional register according differs from a conventional status register of an embedded microcontroller system because the additional register content prevents further OS negotiations. This is possible because the system data in the additional register identifies the entity or instance, such as a CPU or other master, that takes over execution and passes control to the new entity or instance. The system configuration defined in the system data of the register relates to the identified entity or instance. Defining the new entity or instance in the register decreases power consumption through direct switching without negotiations and increases system security. This also avoids conflicts in using shared resources. Furthermore, the system frequency can be reduced because the tasks can be executed in the same time frame at a lower frequency.

The system controller may be an interrupt controller receiving hardware or software requests. The system controller is preferably a semiconductor integrated circuit. The system controller can include the register with storage locations containing sets of predefined system data for different operating conditions of the system assigned to individual interrupts or requests. The register can be initialized to set system configurations using the register content. The system data in the register is defined and stored before receipt of a corresponding interrupt. The system controller containing the register transmits a selection signal to the register to select and activate a predefined storage location assigned to the received interrupt. This sets the corresponding system configuration with the predefined system data in the register. The predefined register contents are set to avoid any further interaction of the operating system for setting the operating conditions which are conventionally set through execution of software routines of the operating system after receipt of a respective interrupt.

The hardware requests may be interrupt requests or interrupt requests with conditions or parameters. The interrupt controller may also receive software requests in form of software interrupts, TRAPs, software interrupts or TRAPs with conditions or parameters. The system controller may handle different kinds of exceptions. Exceptions may be classified as faults, traps or aborts depending on the way they are reported and whether the instruction that caused the exception can be restarted without loss of program or task continuity. A fault is an exception that can generally be corrected and once corrected allows the program to be restarted with no loss of continuity. When a fault is reported, the processor restores the machine state to the state prior to beginning execution of the faulting instruction. The return address for the fault handler is the faulting instruction, rather than to the instruction following the faulting instruction. A trap is an exception that is reported immediately following the execution of the trapping instruction. Traps allow execution of a program or task to continue without loss of program continuity. The return address for the trap handler is the instruction to be executed after the trapping instruction. An abort is an exception that does not always report the precise location of the instruction causing the exception and does not allow a restart of the program or task that caused the exception. Aborts are used to report severe errors, such as hardware errors and inconsistent or illegal values in system tables.

There may be a single register assigned to all interrupt resources or a specific register for each interrupt resource or even a group of resources.

The register may be locked or at least partially locked. Locking the register protects the register's content from modification by any resource. Locking a register may allow one resource or multiple resources or groups of resources to modify the register's data but protect them from modification by any other resource.

The whole register for a specific request (interrupt) may be disabled or enabled. The register may contain several control fields. Only one or several control fields of the register may be used. The register may have one data field which performs the task of an identifier in order to pass the execution to a dedicated hardware or software. The register may also include a data field that is a sub-identifier.

The register may also contain a data field that defines which stack pointer will be used. The register may have a data field controlling access rights to system resources. For example, the register may determine whether an emulation tool can access resources of the active entity. The active entity is the unit or system (e.g. an embedded microcontroller/CPU system) which performs the current operation. Different modes like kernel, supervisor or user mode may be defined. Copying register content may be enabled or disabled through a specific setting in the register. In particular, copying register content from one register to another may be controlled. A secure mode of conditions for safe operation may be set through a register field. Access through predefined address spaces with memory management unit (MMU) protection enabled or disabled may be set through a specific register field or a protected address space may be directly defined. A resource may be hardware or software, such as a single CPU, a virtual CPU or multiple CPUs or virtual CPUs, different applications, drivers etc. Register fields in the register can be optional.

The only mandatory field is a identifier field which controls and passes the execution to dedicated hardware, software or hardware/software combination. The identifier may define which hardware (a first or a second CPU or a first or a second DMA, different virtual CPUs etc.) takes over execution of the program. A sub-identifier may be virtual or it may be a certain DMA-channel in a multi-DMA system. An entity may be identified through the identifier field in the register and the entity may be a specific hardware, software or a hardware/software combination.

The register may have a secure mode field. The secure mode may restrict access capabilities, enable encryption and decryption or other protection features.

The register may have one or more data fields controlling the resources of the system. A resource may be the time an entity such as a system/bus master like a CPU has access to the embedded system. The execution time of two (virtual) CPUs may be partitioned by the percentage of clock cycles each individual (virtual) CPU has access to the system resources, such as code and data memory, system components and other peripherals. An entity or resource may also be a DMA, DTC etc. The register may have one data field controlling the system resources during inactive time of parts of the system. The register may also have a data field controlling the resources of the system during interrupt situations. The register may have a data field controlling the resource's handling and may pass responsibility to another part of the system. For example, the control capabilities may be passed to a clock generation module. The clock generation module may be enabled to switch all clock or system time to one CPU while the other is in a low power mode. Alternately the clock generation module may increase the clock and system time given to a CPU by a certain amount. A register field may configure which parts of the system may be powered up or powered down and/or how the system clock is distributed to different resources and/or tasks. Another register field may configure the frequency of a system clock or a supply voltage level of a specific system supply voltage domain. Register fields may select safe operation situations, such as watchdog operation, expiring time, clock domains, supply voltage supervising and monitoring, a sequence of changing operating conditions like dynamic or adaptive voltage scaling which may be different for logic blocks versus memory blocks, low power conditions with reduced operating frequency, sequencing and entering or leaving of an active full operation mode.

An identifier stored in the register may indicate an entity that should perform an operation relating to the request that triggered the received interrupt. If the "called" or "target" entity differs from the current entity, a change of entities is required. The identifier of the entity that is currently active when the interrupt arrives is the present identifier and the new entity is the target identifier. The apparatus according to this embodiment of the invention may contain a storage location in order to handle an entity hand-over where present, previous and target identifiers (entities) are stored. This could be a stack or status register provided in the target entity. The data representing the identifier may then be pushed on the stack, when the change of entities occurs. Such a stack, or storage location for identifiers can advantageously be provided in each entity, so that each entity has information about the previous entity or a target entity. An atomic unit may be provided which may be referred to as service of interrupt request sequencer. This unit may store present, previous and/or target entities on a stack.

The present invention is also a method of configuring an embedded microcontroller system. A set of predefined system data for a system operating condition is assigned to an interrupt. The set of predefined system data is stored in a register before the interrupt is received. When the interrupt is received, a selection signal selects a predefined storage location of the register containing the corresponding set of predefined system data and activates the corresponding system configuration using the predefined system data stored in the register. The stored data may configure the system including the features as set out above.

In another embodiment, an embedded microcontroller system includes a central processing unit, a system controller receiving and handling an interrupt, a register storing a present entity identifier indicating the present master; and a resource coupled to the register. The resource can store an entity identifier which can use the resource and include comprise logic circuit comparing the present entity identifier from the register with the stored entity identifier to decide whether the present entity can use the resource. In this embodiment, the previously described register contains at least the present entity (or also the calling and the target entity as described above) and the decision about a resource to be used by an entity is made in the resource. The system data stored in the register permits avoids intervention from the operating system after receipt of a request or interrupt is then distributed in the resources. Each resource must have a register or storage location for storing at least an entity identifier such as a corresponding code. A resource may also store several entity identifiers. The resource may be a USB port, an ADC, an UART or a CPU. The resource may contain the required information and logic circuits to carry out the comparison and make the decision.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
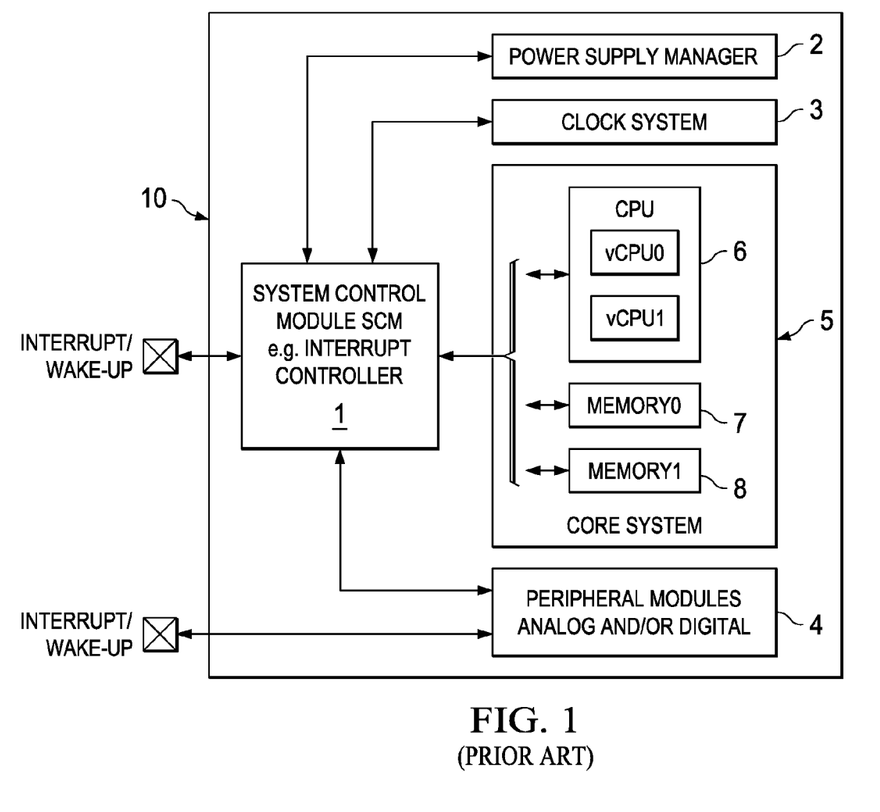
FIG. 1 is a simplified diagram of a conventional embedded microcontroller system.

FIG. 1 is a simplified diagram of an embedded microcontroller system 10 of the prior art. Interrupt controller 1 provides the system control. Interrupt controller 1 receives interrupts or wakeup signals from other system instances implemented in hardware or software or combinations of hardware and software. Interrupt controller 1 is coupled to power supply manager 2, clock system 3, analog or digital peripheral modules 4 and core system 5. Core system 5 includes CPU 6 with virtual CPUs vCPU0 and vCPU1, and memory banks 7 and 8. Interrupt controller 1 may have variable interrupt levels, nesting capability or other features. Only very simple applications still run under the same environment without any task separation in embedded control applications. Most applications use an operating system (OS). The OS is implemented in the core system 5 of FIG. 1. For example, virtual CPU vCPU0 receives the interrupts and the OS is executed in vCPU0. The OS handles all the switching conditions between the different software parts in accordance with the present hardware and/or software. The OS receives the interrupt request, prepares its execution, passes the operation to the interrupt handler and receives the execution capability which may be data and status information back and completes the interrupt request situation. All this takes time and consumes power.

Figure 2:
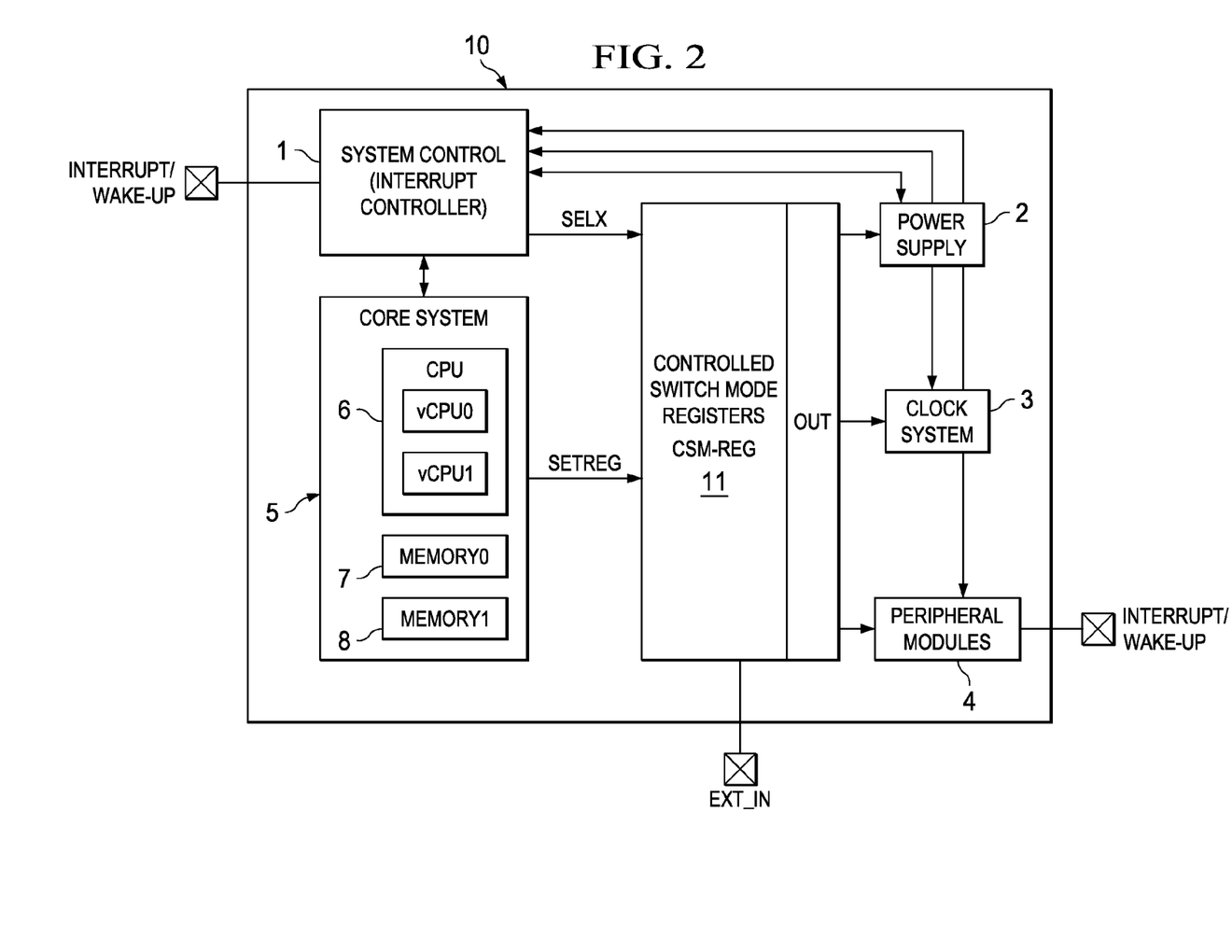
FIG. 2 is a simplified diagram of an embedded microcontroller system of an embodiment of this invention.

FIG. 2 shows a simplified diagram of an embodiment implemented in accordance with aspects of the invention. This embodiment is preferably implemented in hardware as a semiconductor integrated circuit. Each of the stages shown in FIG. 2 is a distinct hardware stage or semiconductor integrated circuit receiving and transmitting at least the input and output signals shown. Embedded microcontroller system 10 includes a system control stage 1, core system 5 having CPU 6, virtual CPUs vCPU0 and vCPU1 and memory banks 7 and 8. This example embedded microcontroller system 10 includes power supply managing stage 2, clock system 3 and peripheral modules 4. Embedded microcontroller system 10 includes controlled switch mode registers 11 (CSM_Reg). These CSM registers 11 can be directly addressed and selected through selection signal SELX from system control stage 1. System control stage 1 may be an interrupt controller. The settings in the CSM register 11 are written either through the core system 5 in a separate negotiation step previous to reception of an interrupt or through an external input indicated by pin EXT_IN. The control switch mode of this invention avoids the time and power overhead for defining the conditions for a specific hardware or software request and makes it possible to directly react on a hardware or software request such as an interrupt. The system configuration for a specific request such as signaled by an interrupt signal is predefined and negotiated between the higher priority software (usually the OS or RTOS) and the application demanding for reacting directly upon the request. Predefined corresponding system data is stored in registers CSM_Reg 11. Embedded microcontroller system 10 usually runs under a default operating condition environment. For example, this may be a MSP430 core and a corresponding MSP430-ISA code. A change in the execution sequence or resource configuration of embedded microcontroller system 10 is triggered by an interrupt. This interrupt may be a software interrupt or a hardware interrupt received through pins INTERRUPT/WAKE-UP or from power supply 2, clock system 3, peripheral modules 4 or the core system 5. A software interrupt (SWI) may set an interrupt flag. Another kind of interrupt is a TRAP, which is an instruction normally including some information on parameter or command level. The additional information can be included in a field in the instruction word or it can be provided within associated following words of a multi-word instruction. It is an important condition that prevents any break or violation of the system integrity. Therefore, any parameter or command passing and trigger must not be disrupted. After having received the interrupt (SWI or TRAP) the entire operation has to be completed before control may be passed to any other instance, as for example another interrupt handler. In response to signal SELX, a selected CSM register in CSM registers 11 configures the system. For example, power supply 2, clock system 3 and peripherals 4 and set in accordance with the request behind the interrupt. CSM registers 11 may contain a bank of individual CSM registers, each containing a specific configuration. When selected this register supplies its stored system data to output OUT.

In an alternative embodiment, CSM registers 11 forms part of system control 1. Thus system control 1 or interrupt controller 1 includes CSM register 11. This invention may also be a system controller embodied as a semiconductor integrated circuit including a CSM register.

Figure 3:
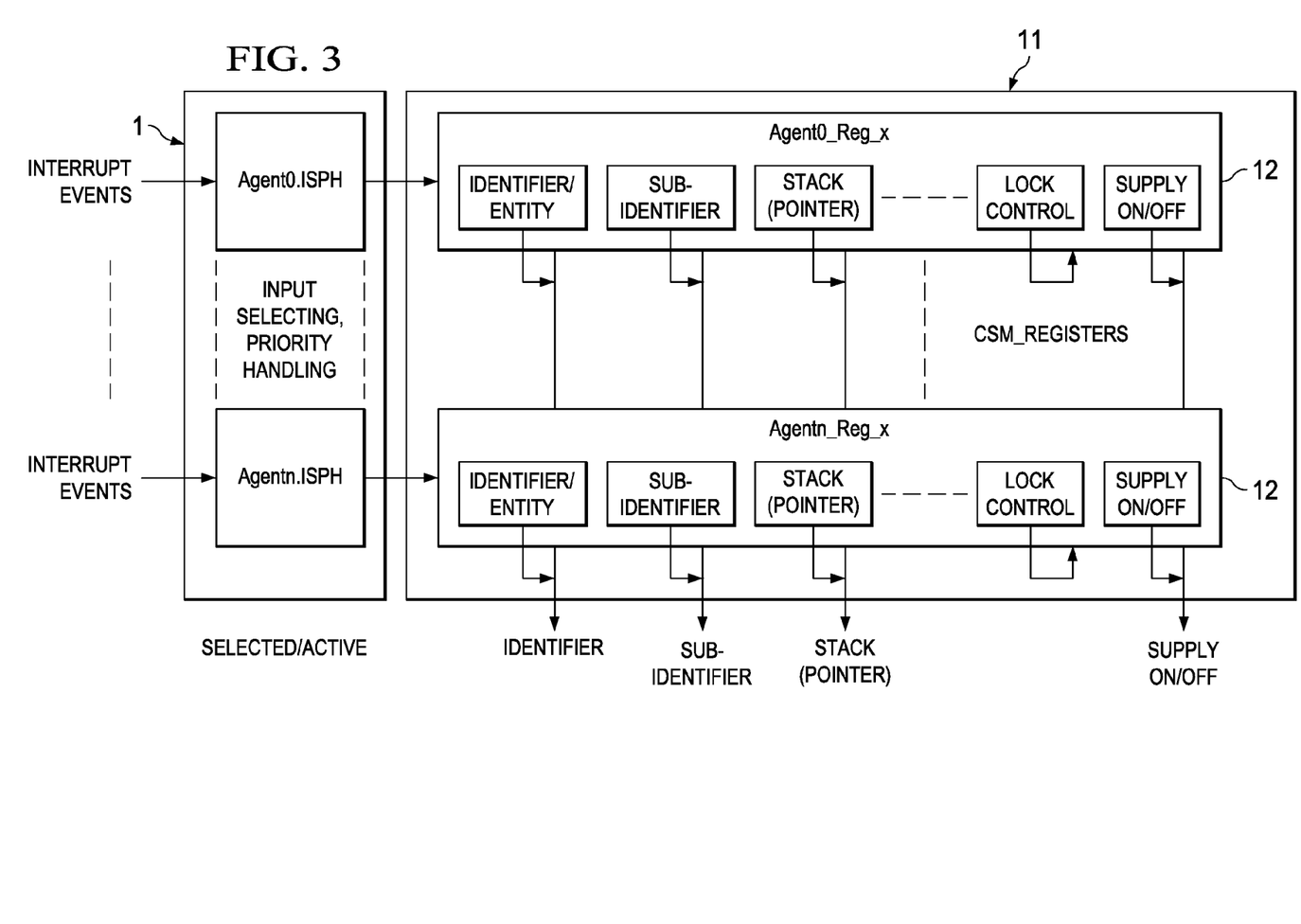
FIG. 3 is a simplified diagram of an interrupt controller and a control switch mode register of an embodiment of this invention.

FIG. 3 is a simplified diagram of an interrupt controller such as system control 1 and a control switch mode register such as CSM registers 11 of FIG. 2 according to an embodiment of this invention. Control switch mode register CSM_Register 11 is integrated into or connected to the interrupt controller 1. System settings are grouped into sets of system data contained in the respective CSM register and referred to as agents. Interrupt controller 1 includes interrupt agents Agent0.ISPH to Agentn.ISPH, where ISPH means interrupt selecting priority handling. Typically one agent is triggered but only one interrupt agent is accepted by interrupt controller 1 which responds to this received interrupt. Triggering more than one agent is possible. Each agent, Agent0.ISPH to Agentn.ISPH is assigned to a specific set of system data stored in CSM register 12. This set of system data is called Agent0.REG_x to Agentn.Reg_x. Each set of system data Agent0.Reg_x to Agentn.Reg_x includes specific fields. An example of these fields includes identifier/entity, sub-identifier, stack pointer, lock control and supply on/off. Each interrupt agent Agent0.ISPH to Agentn.ISPH has its own CSM register 12 with associated fields within the register bank CSM_Registers 11. The fields of the selected CSM_Register are latched for use while an agent's register (Agentx.ISPH or Agentx.Reg_x) is updated. In some modes only the active entity in the system actually processing the current operation may update the data. If the system data output is latched, the latched output remains stable until a new control situation is established in the agent's registers such as receipt of a new interrupt. The latched output is optional. There are at least two situations where the latched output may be required: the register to load control information may only be updated by sequential access, which is usually the case by updating the register by software; or the control information changes the present operation conditions in a way that the update sequence by software cannot be regularly completed.

Interrupt controller 1 sorts all received interrupt events and verifies priority. In an advantageous embodiment, the interrupt agents Agent0.ISPH to Agentn.ISPH are all configured and implemented according to the same basic principle or they may even be identical in terms of fields of the CSM register 11. An interrupt agent Agentx.ISPH represents the entire circuit of system controller 1 active when an interrupt event has to be processed or is active. In an alternative embodiment, register 11 may be included within system controller 1.

Figure 4:
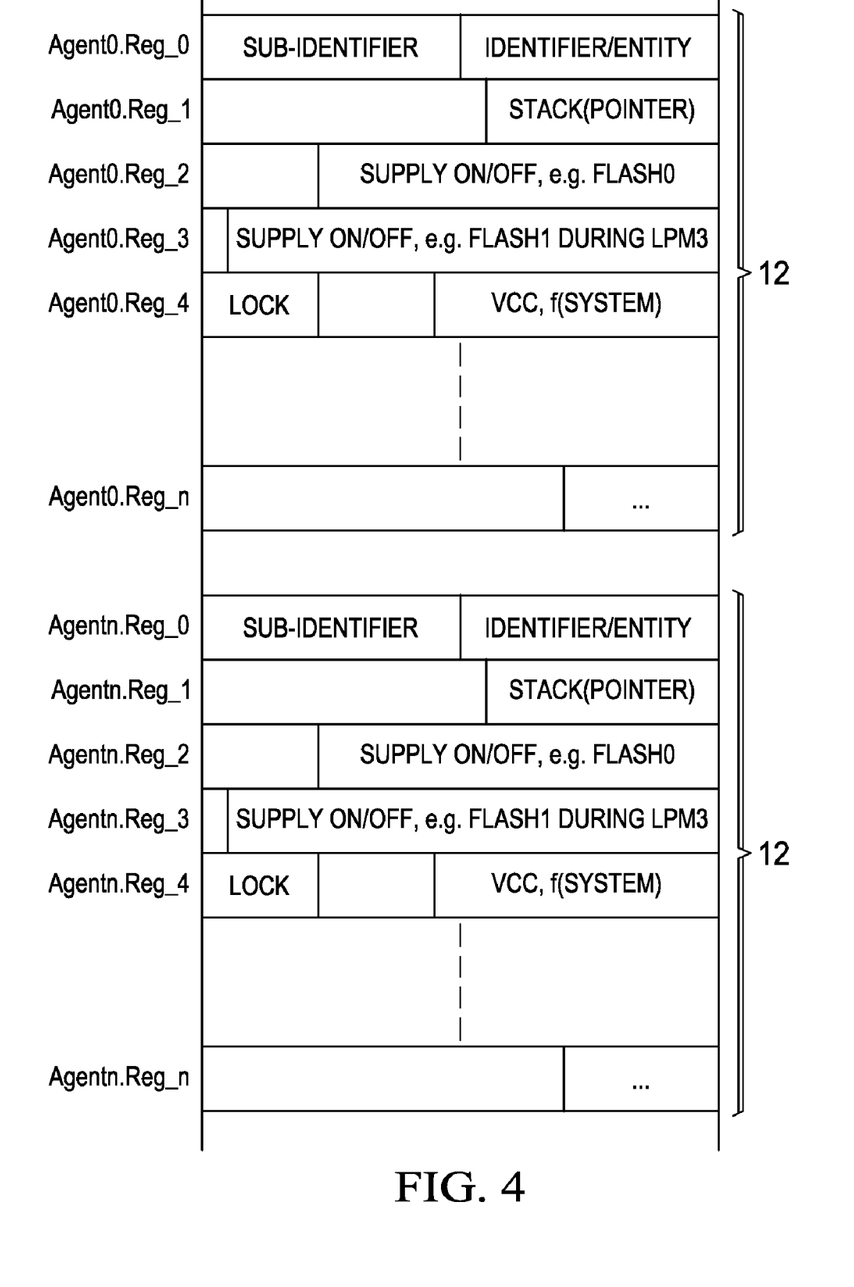
FIG. 4 is a simplified diagram of a control switch mode register of an embodiment of this invention.

FIG. 4 shows two examples of CSM_Register 12 of the bank of CSM registers 11 of FIG. 3. Agent0 may be assigned register locations Agent0.Reg_0, Agent0.Reg_1, Agent0.Reg_2, Agent0.Reg_3, Agent0.Reg_4 to Agent0.Reg_n. Another agent Agentn is assigned register locations Agentn.Reg_0, Agentn.Reg_1, Agentn.Reg_2, Agentn.Reg_3, Agentn.Reg_4 to Agentn.Reg_n. The different fields of each CSM Register 12 for a specific agent are organized according to the same principle. The fields may include: an identifier for an entity such as a CPU or embedded microcontroller system; a sub-identifier; and a stack pointer. The fields may include: fields for supply voltage status ON/OFF for example for a flash memory FLASH0, or FLASH1 during low power mode 3 LPM3; a locking field provided for a locking status; and a field for general supply voltage domain configurations VCC and clock frequencies f(system). The control bits in CSM register 12 may be accessed through software. Access rights for different entities or sub-entities may be individually assigned. All or some fields may be locked until the next boot preventing software disruption and attacks.

Figure 5:
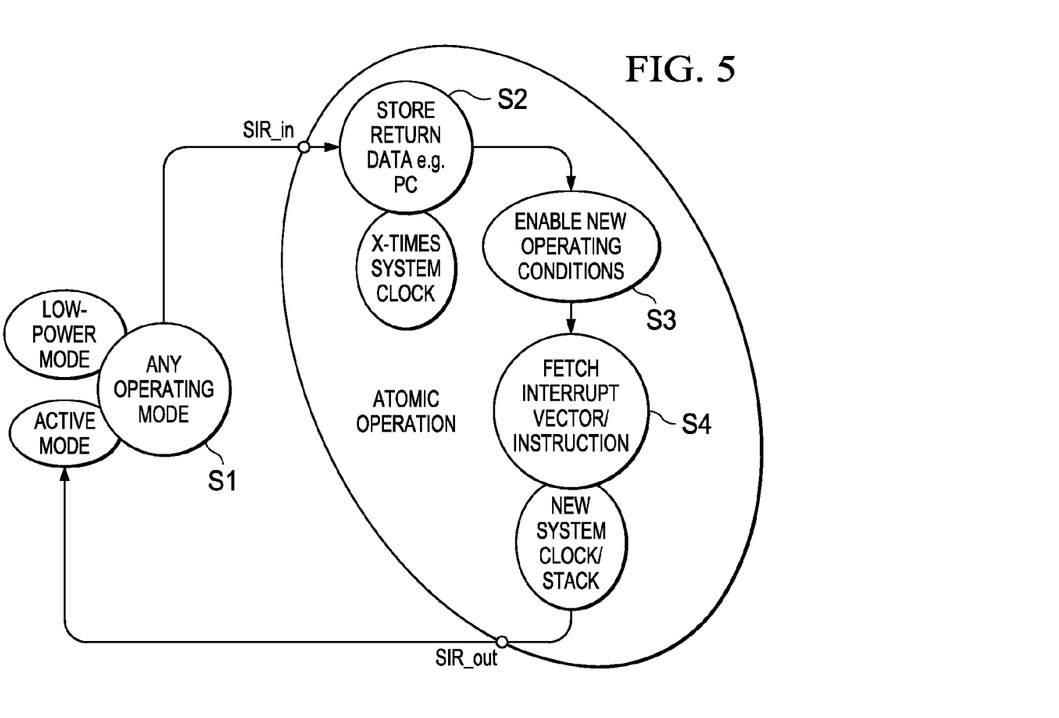
FIG. 5 a simplified state diagram of an embodiment of this invention.

FIG. 5 is a simplified state diagram of soft switching between entities using the atomic service of interrupt Finite State Machine (FSM). A basic advantage resides in the atomic operation during steps S2, S3 and S4. Such atomic operation means that data can not be corrupted and the procedure can not be disrupted within the atomic operation limits. System 1 will complete the configuration change before the operation of the request is started or the control of the next operation is passed to another instance. In the beginning system 1 may be in any operating mode in step S1. After receipt of an interrupt (SIR_in) in step S2, return data is stored in step S2. An example of this return data is the program counter and the status register. After a certain number of clock cycles (x-times system clock) operation proceeds to step S3. In step S3 the new operating conditions are enabled through the CSM registers 11 shown in FIG. 2. In step S4, the interrupt vector or other instructions are fetched with a new system clock and information is retrieved from the stack. Following this process step 4 leaves service of the interrupt request (SIR_out). System 1 returns to step 1 in active mode to the interrupt handler.

The return data can advantageously be stored on a stack that is active when the service of interrupt request is started (SIR_in) in step S2. The new conditions are only enabled when the return data is stored or the storing mechanism is at least irreversible. Fetching the interrupt vector in step S4 is usually performed under the new operating conditions. Only under certain exceptions, fetching of the interrupt vector may be performed later but usually before fetching the first instruction of the called interrupt handler. Enabling the operating conditions, which are selected for program continuation, does not require extra clock cycles. Any extra clock cycles for specific architectures or functions or any other delay such as needed to stabilize the operating conditions before using them can be provided. They can also be provided for an individual situation and a specific function when switching to another operating condition.

Figure 6:
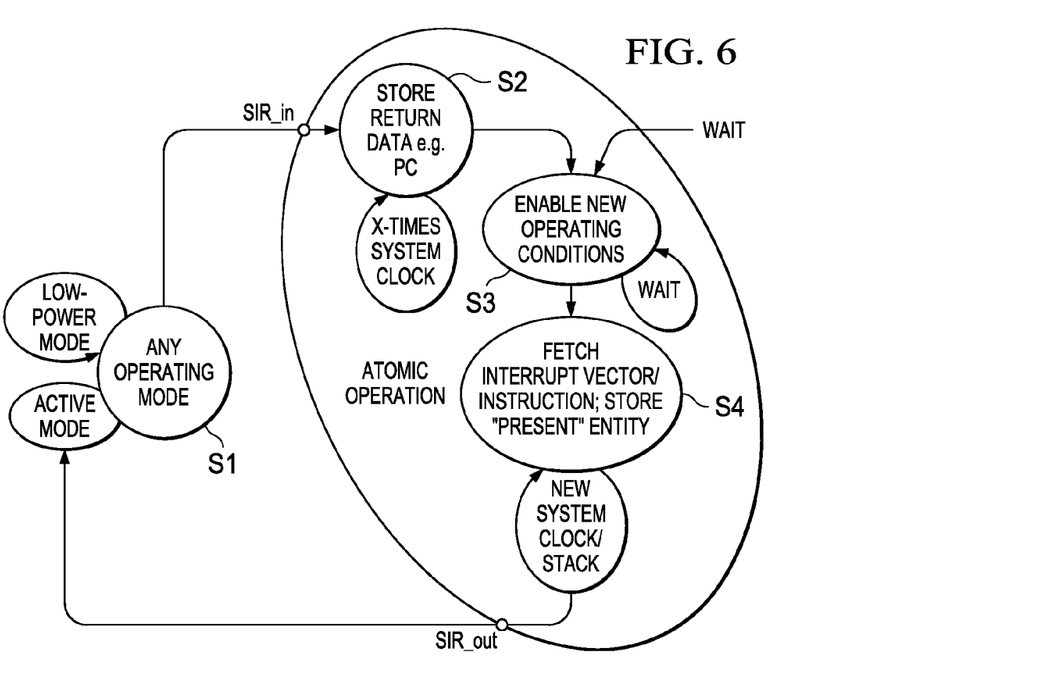
FIG. 6 is a simplified state diagram of an embodiment of this invention.

FIG. 6 is a simplified state diagram of an extension of FIG. 5. FIG. 6 includes a wait state in step S3 after enabling the new operating conditions. FIG. 6 also includes a possibility of storing the present entity in step S4 when fetching the interrupt vector or the instruction. Other aspects of the state diagram of FIG. 6 are identical the state diagram of FIG. 5. The configuration illustrated in FIG. 6 enables low-power and ultra-low-power systems to avoid overhead in power consumption. A zero cycle switch from the previous to present operating conditions without any OS intervention needs zero cycles or exactly the minimum time requested by the wait condition. This is especially important when the software overhead is a reasonable part of the activity in the system.

Figure 7:
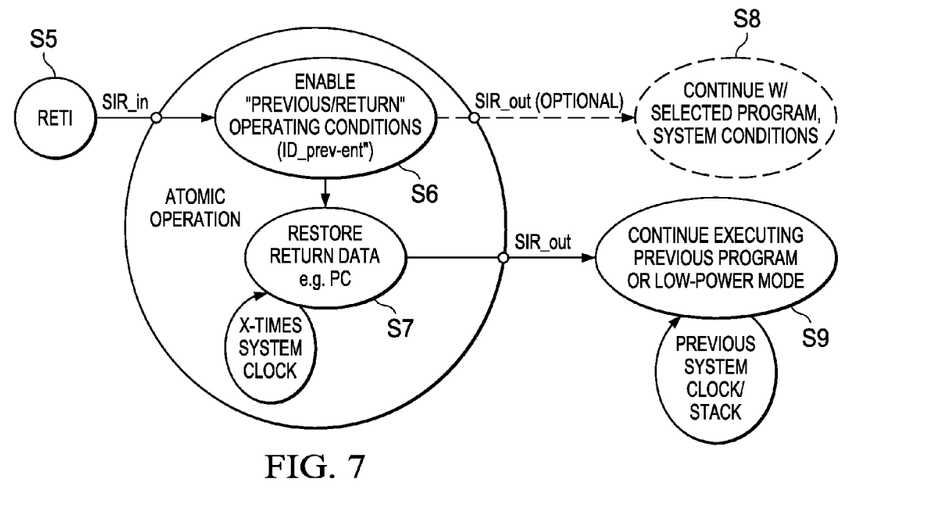
FIG. 7 is a simplified state diagram of an embodiment of this invention.

FIG. 7 is a simplified state diagram illustrating the return from interrupt following the basic principles of the state diagram of FIG. 5. The return from interrupt (RETI) in step S5 serves to restore in an atomic way the previous conditions. There are two optional atomic variants provided through steps S6 and S7: either the actual system conditions may be used to restore the previous return data in step S6, then SIR_out(optional) exit to step S8; or the system conditions are restored to the previous state in step S7 followed by SIR_out exit to step S9. In step S9, the identifier in the previous entity field is used to get the data back from the correct stack. An optional way to continue is to get an indication that no return is needed and that the program continues somewhere else such as with operating system services.

Figure 8:
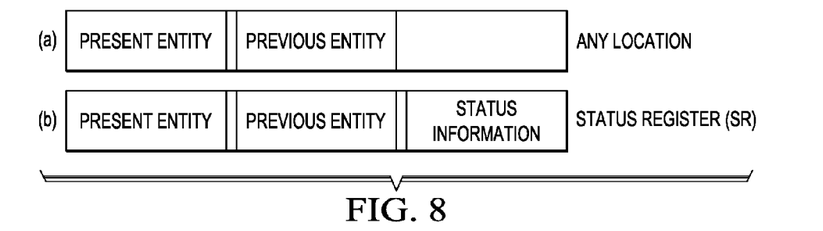
FIG. 8 illustrates registers in an embodiment of this invention.
Figure 9:
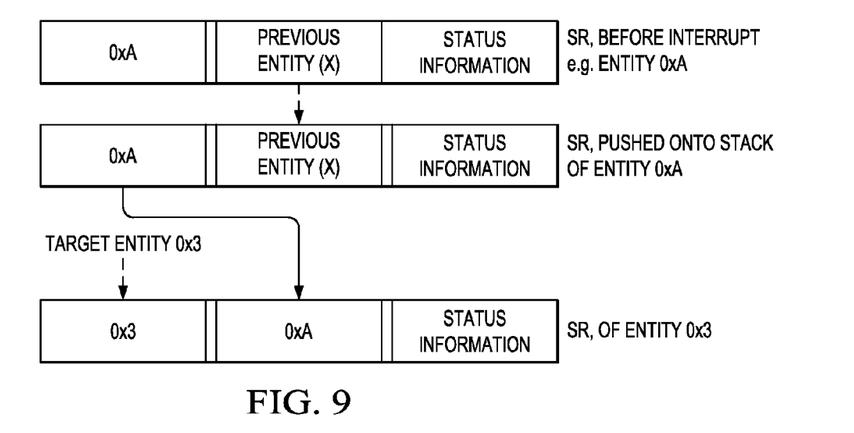
FIG. 9 illustrates registers in an embodiment of this invention.
Figure 10:
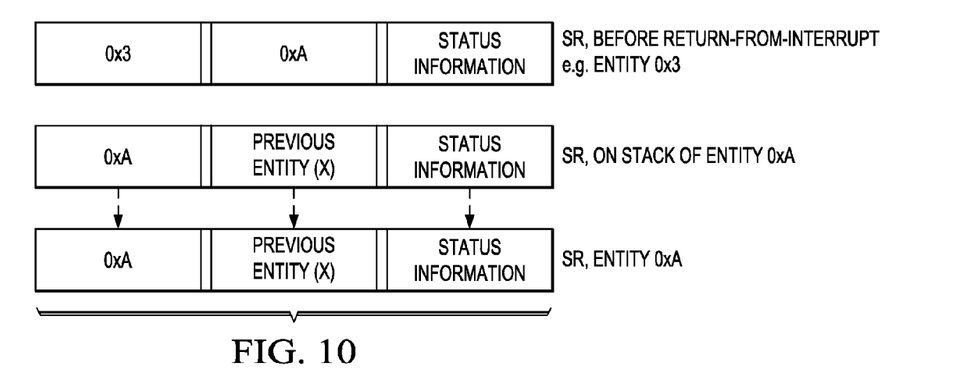
FIG. 10 illustrates registers in an embodiment of this invention.

FIGS. 8, 9 and 10 illustrate storage locations such as status registers SR of two entities such as two different masters in an embodiment of the invention. An entity such as an embedded microcontroller system or a CPU is identified by an identifier. The identifier may be stored in the CSM register 12 as explained above and illustrated in FIG. 4. The identifier may indicate the entity that should perform an operation relating to the request triggered by the received interrupt. If the called or target entity differs from the current entity, a change of entities is required. The identifier of the entity that is currently active when the interrupt is received is called the present identifier and the new entity is called the target identifier. From the perspective of the target entity, there is a previous entity and the present entity.

To handle a change of entities, the system may contain a storage location storing the previous and target identifiers. FIG. 8 illustrates two possible storage locations or registers for storing entity information in alternatives (a) and (b). FIG. 8(a) illustrates storage at any storage location. FIG. 8(b) illustrates storage in a status register SR (b) where other status information is generally stored. The data stored in the register includes the present entity (active entity) identifier and the previous entity identifier.

FIG. 9 illustrates how the register contents of the status register changes when the interrupt arrives. FIG. 9(a) illustrates the contents of the status register before an interrupt arrives. The status register stores the identifier of the current entity (0xA), the identifier of the previous entity (X) and status information. When the interrupt arrives, the status register content of the first entity identifier 0xA is pushed on a stack of the first entity as illustrated in FIG. 9(b). This saves the state of the status register before the interrupt illustrated in FIG. 9(a). The identifier of the first entity 0xA is also copied to second field of the status register of the second entity replacing the previous entity identifier (FIG. 9(c)). The identifier of the second entity 0x3 is copied into the first field of the status register replacing the active entity identifier (FIG. 9(c)). The status register now stores the second entity identifier 0x3 as the active entity and the first entity identifier 0xA as the previous entity and status information after the interrupt.

FIG. 10 shows the status register content upon a return from interrupt (RTI). The status register of the second entity before the return from interrupt stores the present identifier 0x3, the previous identifier 0xA and status information (FIG. 10(a), the same as FIG. 9(c)). The register on the top of the stack stores the previous state of the status register including the first entity identifier 0xA, the previous entity identifier X and status information (FIG. 10(b), the same as FIG. 9(b)). The stack is popped to transfer this information from the top of the stack to the status register data (FIG. 10(c)). The status register information on the stack of the first entity, which takes over operation after return from interrupt, contains the present identifier 0xA, the previous entity identifier X and status information.

The entity identifiers may be WRITE protected against software modifications. An atomic service-of-interrupt-request sequencer may store the target entity on the status register as well as the active entity identifier which is the last active entity before the interrupt. Storing the target entity identifier is useful as the entity can be hardware, software or a specific software task running on certain hardware. The information including a corresponding signal or data indicating the part of the system such as vCPU0 which is the present valid master at the time of the interrupt can be retrieved from the CSM register or a latch at the output of the CSM register. It may also be retrieved from a status register of the target entity or a status register of the calling entity. However, if the entity identifier is retrieved from the status register, the right moment for changing the system properties or operating conditions is reached simultaneously to the FSM sequence. Under normal conditions, the process of changing operating conditions may not be stopped after being initiated, as described above and referred to as atomic procedure.

Furthermore, each entity may store its own identifier. The identifier may be stored in any location in the address space. The identifier may also be stored in any CPU register or a specific CPU register like a status register. The entity identifier may advantageously be a unique number and it may have one or more sub-entity identifiers. These sub-entity identifiers may have more sub-entity identifiers.

The present entity can decide whether it can be called from a previous entity. The identifier of the present entity can be stored in a storage location or a status register may be evaluated by any hardware resource as to whether or not the present entity can use the resource.

In a further embodiment, there may be different Universal Serial Bus (USB) ports. These USB ports may be dedicated to different entities. Each USB port may then have one or more associated stored entity identifiers. Once the entity to be determined the present valid master, an USB port can decide whether or not it can be used by comparing the entity identifier of the present entity with the stored entity identifier. According to this aspect of the invention an embedded microcontroller system each resource (USB, UART, ADC, CPU etc) can be coupled to a storage location storing the present entity. Each resource may then have a storage location and comparator comparing the stored entity identifier with the present entity identifier. Each resource can then decide whether to respond to a specific entity. There may be an USB port, a UART, a CPU or an ADC having a storage location for storing an entity identifier (master identifier). The USB port, UART, CPU and ADC can have a circuit or logic stage to decide if the received present entity identifier matches the stored entity identifier. This embodiment has a register containing at least the present entity or the present and a target entity. The register or the register content is coupled to the resources such as USP port, UART, CPU, ADC in response to a request that requires a change of entities so as to present the new valid entity identifier to the resources.

What is claimed is:

1. An embedded microcontroller system comprising:
  a central processing unit operable to set said embedded microcontroller system in one of a plurality of system configurations;
  a system controller for receiving and handling interrupts including generating a selection signal corresponding to a received interrupt;
  a register set connected to said system controller and said central processing unit, said register set having plural storage locations, each storage location assigned to a corresponding interrupt and containing a set of predefined system data for different system configurations of said embedded microcontroller system, said register set responsive to a selection signal from said system controller to recall said set of predetermined system data corresponding to said selection signal for setting a corresponding system configuration via said central processing unit.

2. The embedded microcontroller system of claim 1, wherein:
  said set of registers includes at least one lock mode protecting at least part of said set of predefined system data from modification and an unlock mode permitting modification of said set of predefined system data.

3. The embedded microcontroller system of claim 1, wherein:
said sets of predetermined system data include data for configuration of system clock distribution for system resources and tasks.

4. The embedded microcontroller system of claim 3, wherein:
said central processing unit includes a plurality of virtual central processing units each allocated a predetermined portion of time of said central processing unit; and
said predetermined system data for configuration of system clock distribution for system resources and tasks includes data for allocation of central processing unit time to said plurality of virtual central processing units.

5. The embedded microcontroller system of claim 4, further comprising:
a plurality of independently powered power supply domains; and
said predetermined system data for configuration of system clock distribution for system resources and tasks includes data controlling a power supply voltage for each power supply domain.

6. The embedded microcontroller system of claim 5, wherein:
said data controlling a power supply voltage for each power supply domain includes data for powering up at least one power supply domain.

7. The embedded microcontroller system of claim 5, wherein:
said data controlling a power supply voltage for each power supply domain includes data for powering down at least one power supply domain.

8. The embedded microcontroller system of claim 1, wherein:
said sets of predetermined system data include data for setting a system clock frequency; and
wherein the embedded microcontroller system further comprises:
a plurality of independently powered clocked clock domains; and
said predetermined system data for configuration of system clock frequency includes data controlling a clock frequency for each clock domain.

9. The embedded microcontroller system of claim 1, wherein:
said sets of predefined system data include data selecting safe operation conditions; and
the embedded microcontroller system further comprises:
a watchdog timer having a selectable duration time,
said central processing unit is connected to said watchdog timer and responsive to expiration of said duration time of said watchdog timer, and
said data selecting safe operating conditions includes data selecting a delay time for said watchdog timer.

10. The embedded microcontroller system of claim 1, wherein:
said sets of predetermined system data include data identifying an entity within said embedded microcontroller system to processes a request triggered by said interrupt.

11. The embedded microcontroller system of claim 10, wherein:
said sets of predetermined system data include data identifying a previous entity.

12. The embedded microcontroller system of claim 1, wherein:
said sets of predetermined system data include secure mode data to enable data encryption and decryption.

13. The embedded microcontroller system of claim 1, further comprising:
a register having storage locations containing at least a present entity identifier that indicates a present master in said embedded microcontroller system; and
a resource within said embedded microcontroller system coupled to the register, said resource storing an entity identifier of an entity permitted to use the resource and including a logic circuit comparing the present entity identifier from said register with said stored entity identifier to determine whether said present entity can use said resource.

14. A method of configuring an embedded microcontroller system, comprising the steps of:
assigning a set of predefined system data for an operating condition of the embedded microcontroller system to an interrupt;
storing the set of predefined system data in a register before receipt of the interrupt;
receiving the interrupt;
selecting a predefined storage location of the register containing the set of predefined system data corresponding to the received interrupt; and
setting a system configuration within the embedded microcontroller corresponding to the selected predefined system data.

* * * * *